United States Patent
Dent et al.

(10) Patent No.: US 6,243,587 B1
(45) Date of Patent: Jun. 5, 2001

(54) METHOD AND SYSTEM FOR DETERMINING POSITION OF A MOBILE TRANSMITTER

(75) Inventors: Paul Wilkerson Dent, Pittsboro; Havish Koorapaty, Raleigh, both of NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 08/988,129

(22) Filed: Dec. 10, 1997

(51) Int. Cl.[7] ..................................................... H04Q 7/20
(52) U.S. Cl. .......................... 455/456; 455/422; 455/427; 455/503; 342/457
(58) Field of Search ..................................... 455/403, 422, 455/456, 457, 427, 502, 503, 11.1; 342/442, 444, 457, 453

(56) References Cited

U.S. PATENT DOCUMENTS

| | | |
|---|---|---|
| 5,048,059 | 9/1991 | Dent . |
| 5,084,669 | 1/1992 | Dent . |
| 5,379,047 | 1/1995 | Yokev et al. .......................... 342/457 |
| 5,420,592 | 5/1995 | Johnson ................................ 342/357 |
| 5,508,707 | 4/1996 | LeBlanc et al. ..................... 342/457 |
| 5,548,296 | 8/1996 | Matsuno ................................ 342/457 |
| 5,596,330 | 1/1997 | Yokev et al. . |
| 5,619,503 | 4/1997 | Dent ..................................... 370/330 |
| 5,890,068 * | 3/1999 | Fattouche et al. ................... 455/456 |
| 5,918,159 * | 6/1999 | Fomukong et al. ................. 455/456 |
| 5,918,181 * | 6/1999 | Foster et al. ......................... 455/456 |
| 6,009,091 * | 12/1999 | Stewart et al. ....................... 455/456 |
| 6,009,334 * | 12/1999 | Grubeck et al. ..................... 455/456 |
| 6,011,974 * | 1/2000 | Cedervall et al. ................... 455/456 |

FOREIGN PATENT DOCUMENTS

| | | |
|---|---|---|
| WO 95/26510 | 10/1995 | (WO) . |
| WO 97/22888 | 6/1997 | (WO) . |

OTHER PUBLICATIONS

C. D. Burnside, "Electromagnetic Distance Measurement", Collins 1982, ISBN 0–246–11624–2, pp. 81–82, 148–152.

* cited by examiner

*Primary Examiner*—Nay Maung
(74) *Attorney, Agent, or Firm*—Wood, Phillips, VanSanten, Clark & Mortimer

(57) ABSTRACT

A system and method is provided for determining position of a mobile transmitter, such as a cellular telephone. The transmitter transmits a first signal at a first frequency (such as a RACH signal) to first and second receiving stations. The receiving sites are located at known locations. The transmitter then transmits a second signal at a second frequency (such a traffic signal) to the first and second receiving stations. The phases of the first and second signals at the first and second receiving sites are measured. Using the measured phases and the first and second frequency values, a range difference is calculated. This range difference defines a first hyperbola having the first and second receiving stations as foci on which the transmitter is located. By repeating the procedure with a different pair of receiving sites, a second hyperbola can be determined. The intersection of the first and second hyperbolas define the position of the transmitter.

33 Claims, 8 Drawing Sheets

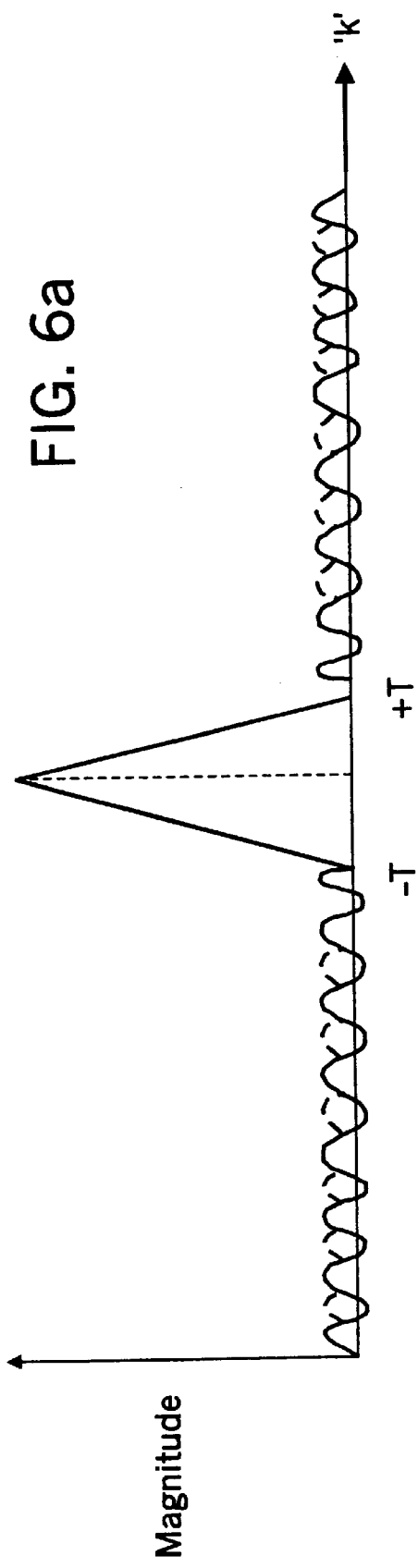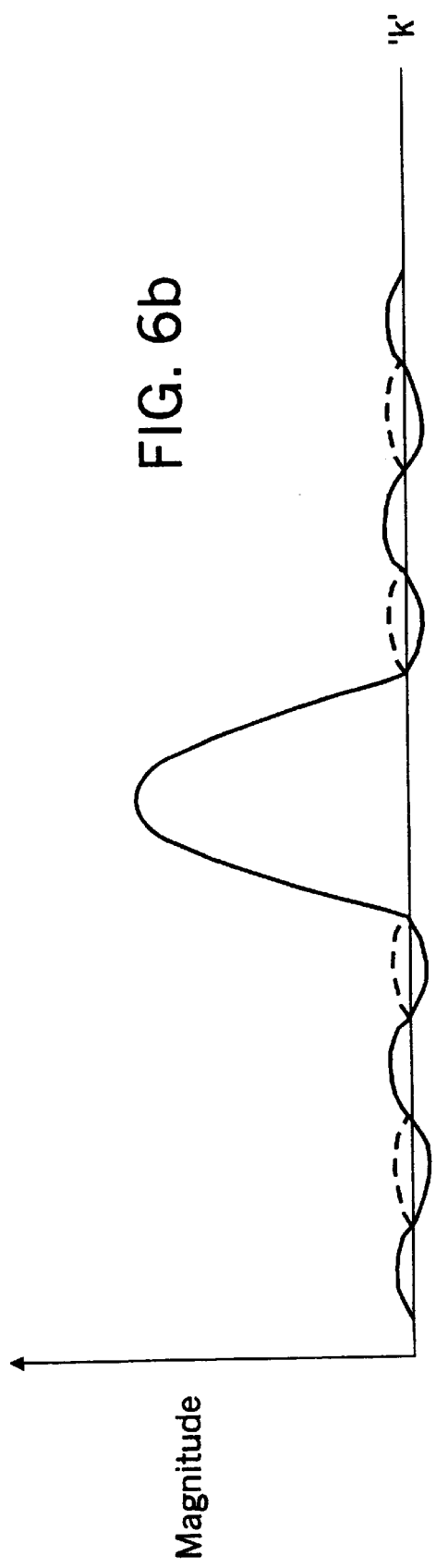

METHOD AND SYSTEM FOR DETERMINING POSITION OF A MOBILE TRANSMITTER

BACKGROUND OF THE INVENTION

The present invention relates generally to position detection methods and systems, and more particularly, to a method and system for detecting a position of a mobile device or transmitter, such as a cellular telephone, based on phase differences of transmitted signals of two or more frequencies received at two or more receiving sites.

Prior position detection, or navigation, systems may be generally divided into two categories: passive navigation systems and active navigation systems. In a passive navigation system, a mobile device determines its position based on signals received from transmitters positioned at known locations. In an active navigation system, the mobile device transmits signals which are received by one or more receivers positioned at known locations. The position of the mobile device is then determined based on the received signals and the known position of the receivers.

In the past, passive navigation systems have been generally favored over active navigation systems. One reason for this favoritism is that in active systems each mobile unit must transmit signals to determine its position. Since the number of mobile units in a single active system may be in the millions, these signals may overly congest the active system and may cause the system to malfunction. This problem is exacerbated in situations where the position of the mobile unit needs to be continuously determined with a high degree of accuracy. For example, an airplane needs virtually continuous position determinations due to its high velocity and, therefore, would need to transmit signals virtually continuously. Having a large number of mobile units continuously transmitting such signals could possibly overload, or congest, an active navigation system.

One prior active navigation system was espoused by the GEOSTAR corporation. In the GEOSTAR system, at least one orbiting satellite transmits signals to mobile transponders and receives replies from the mobile transponders. For calculation purposes, the GEOSTAR system assumes that the mobile transponder is on the earth's surface. By measuring the time a signal takes to travel from a satellite to a mobile transponder and back to the satellite (loop propagation delay), the mobile transponder can be determined to lie somewhere on a calculated sphere of appropriate radius. Since the intersection of the calculated sphere and the earth's surface is a circle, the GEOSTAR system thereby locates the mobile transmitter somewhere on the circle. If two satellites are employed, the mobile transponder can be deduced to also lie on a second circle. Since the intersection of these two circles is two points, the GEOSTAR system can therefore locate the mobile transponder at one of the two points.

The GEOSTAR system unfortunately exhibits some significant deficiencies. Firstly, the GEOSTAR system suffers from the problem of congestion as experienced by other prior active navigation systems. Secondly, the GEOSTAR system relies upon loop delay measurements which are typically of questionable reliability or accuracy. For example, the accuracy of loop delay measurements is deleteriously affected by timing errors in the transponder hardware which may be caused by any number of known factors, such as temperature, imprecise manufacturing tolerances and the like. In addition, GEOSTAR systems typically use wideband signal transmissions to assure accurate loop delay measurements. Unfortunately, such wideband signal transmissions occupy a large portion of available bandwidth, thus significantly contributing to the aforedescribed problem of congestion.

Capacity is an issue at the heart of cellular communications systems and satellite-based mobile communications systems. Enough capacity for all users is guaranteed by dividing the service area into a large number of small cells with the ability to re-use the limited number of available radio frequencies again in different cells which are adequately sparated. U.S. Pat. No. 5,619,503 issued to Dent on Apr. 8, 1997 describes improvements to multi-cell or multi-beam communications systems that permit higher capacity by denser frequency re-use—ultimately permitting every frequency channel to be used for a different purpose in every cell or beam. The disclosure of U.S. Pat. No. 5,619,503 is hereby incorporated by reference herein and provides the capacity improvements necessary to allow an active navigation system to succeed. Methods to obtain an initial coarse position estimate are also described and may be used in the current invention.

There is thus a need in the art for a system and method for providing active position determination of a mobile transmitter which increases the accuracy of the position determination.

SUMMARY OF THE INVENTION

This need is met by a method and system in accordance with the present invention wherein a first signal at a first frequency and a second signal at a second frequency are received from a transmitter at first and second receiving stations. Based on phase shifts of the signals received at the first and second receiving stations, a range difference is calculated which locates the transmitter on a first hyperbola having the stations as foci.

In accordance with one aspect of the present invention, a method is provided for determining position of a mobile transmitter, such as a cellular telephone, relative to first and second receiving sites. Either of, or both of, the first and second receiving sites may be a land-based cellular base station or a satellite relay station. A first signal at a first frequency is transmitted by the mobile transmitter and received at the first and second receiving sites, as respective first and second received signals. A second signal at a second frequency is transmitted by the mobile transmitter and received at first and second receiving sites, as respective third and fourth received signals. A first phase difference measurement is made based on the first and second received signals. A second phase difference measurement is made based on the third and fourth received signals. A position of the mobile transmitter is determined based on the first and second phase difference measurements, the first and second frequencies and the first and second known locations. In particular, the first and second phase difference measurement are scaled based on the first and second frequencies and a range difference is determined. For example, a frequency difference may be determined between the first and second frequencies and the difference between the first and second phase difference measurements is scaled by the frequency difference to obtain a range difference.

The first phase difference measurement is preferably performed by determining a first phase shift for the first received signal; determining a second phase shift for the second received signal; and making the first phase difference measurement based on the first and second phase shifts. Similarly, the second phase difference measurement is preferably performed by determining a third phase shift for the third received signal; determining a fourth phase shift for the fourth received signal; and making the second phase difference measurement based on the third and fourth phase shifts.

The calculated range difference places the transmitter on a first hyperbola with foci at the first and second receiving stations. To further define the position of the transmitter, the method may further comprise the steps of calculating third or fourth phase difference measurements for a third receiving site and one of the first or second receiving sites; localizing the transmitter on a second hyperbola related to the third receiving site and the one of the first and second receiving sites; and determining the position of the mobile transmitter based on the intersection of the first and second hyperbolas.

The first frequency may be a random access channel and the second frequency may be a traffic channel. Preferably, at least one of the first and second frequencies is contained in set of frequencies allocated to the mobile transmitter for frequency hopping communication. The signal on at least one of the first and second frequencies may be comprised of signal bursts formatted in accordance with a time division multiple access format.

One aspect of the present invention is the process for making the required measurements. For example, the step of making a first phase difference measurement and the step of making a second phase difference measurement may comprise the steps of converting the first, second, third and fourth received signals into a digital stream of numerical values representative of instantaneous phases of the first, second, third and fourth received signals; and determining the position of the transmitter based on the stream of numerical values and the first and second frequencies.

Additionally, the step of converting may comprise the steps of downconverting the first and third received signals to a first intermediate frequency; downconverting the second and fourth received signals to a second intermediate frequency; and sampling and analog-to-digital converting the downconverted first, second, third and fourth received signals. The first and second intermediate frequencies may be generated by local oscillators which may be synchronized to a common reference frequency. The common reference frequency could be derived from satellite navigation signals.

If the intermediate frequency is set to approximately zero, the step of sampling and analog-to-digital converting may comprise the step of quadrature converting the downconverted first, second, third and fourth received signals to yield the stream of numerical values containing complex values. Alternatively, the step of sampling and analog-to-digital converting may comprise the step of logpolar converting the downconverted first, second, third and fourth received signals to yield the stream of numerical values containing numerical value pairs representative of instantaneous signal phase and amplitude.

The step of determining the position may include the step of determining first, second, third and fourth phase difference measurements for the first, second, third and fourth received signals. The stream of numerical values can then be correlated to determine an integral number of samples delay between arrival of the first and second received signals and the third and fourth received signals and to determine respective first and second correlation phases. The correlation step may comprise determining the correlation phases at the first frequency and the second frequency and using the correlation phases to determine the first and second phase difference measurements.

The present invention further provides for translation in time of the phase measurements. For example, the step of making a first phase difference measurement comprises the step of performing multiple measurements of the first phase difference measurement at different instants of time and interpolating or extrapolating the multiple measurements to determine a value for the first phase difference measurement at an instant of time at which the second phase difference measurement was made.

By varying the difference between the first and second frequencies in accordance with the present invention, accuracy can be adjusted. In particular, a frequency difference between the first and second frequencies is determined. The frequency difference is then compared to a predetermined frequency value. If the determined frequency difference is less than the predetermined frequency value, then a new value for at least one of the first and second frequencies is selected such that the frequency difference is larger. The first and second phase difference measurements are then repeated using the new value for the at least one of the first and second frequencies.

In accordance with another aspect of the present invention, a system for determining position of a mobile transmitter is provided. The mobile transmitter is capable of transmitting first and second signals at respective first and second frequencies. The system comprises a first and second receiving station for receiving the first signal and a network control processor for computing a first phase difference based on the first signal received at the first and second receiving stations. The first and second receiving stations also receive the second signal and the network control processor coputes a second phase difference based on the second signal received at the two stations. The network control processor then determines a range difference measurement of the mobile transmitter based on the first and second phase difference measurements and the first and second frequencies. The first receiving station comprises a first phase measuring circuit for determining a first and third phase value for the first and second signals respectively as received at the first receiving station. Similarly, the second receiving station comprises a second phase measuring circuit for determining a second and fourth phase value for the first and second signals respectively as received at the second receiving station.

These and other features and advantages of the present invention will become apparent from the following detailed description, the accompanying drawings and the appended claims.

BRIEF DESCRIPTION OF THE DRAWINGS

FIGS. 6a and 6b are graphical representations of an exemplary autocorrelation functions of random digitally-modulated signals;

DETAILED DESCRIPTION OF THE INVENTION

Figure 1:
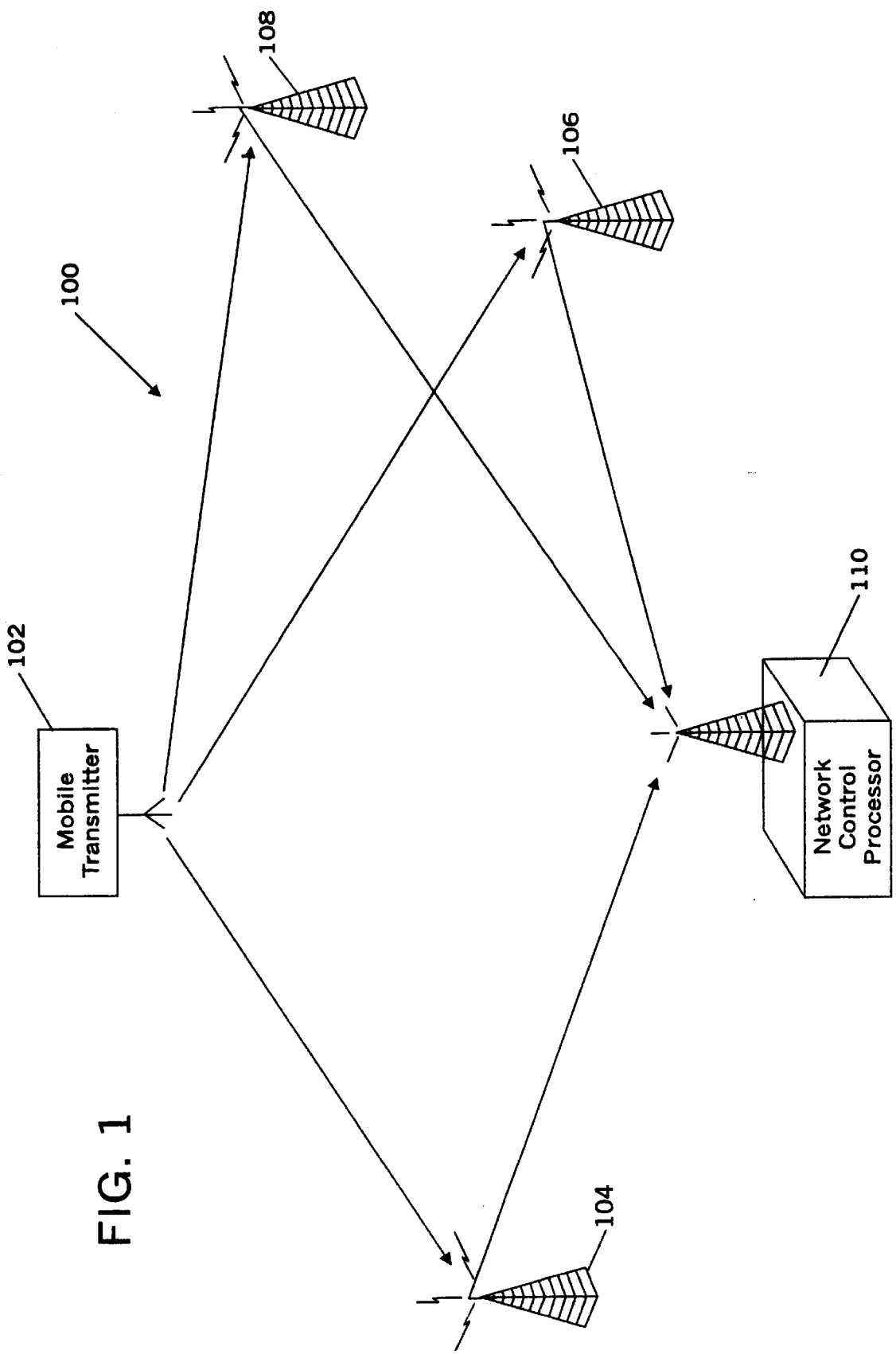
FIG. 1 is a diagram of a system in accordance with the present invention comprising a mobile transmitter and three receiving stations.

A system 100 for determining position of a mobile transmitter 102 in accordance with the present invention is shown in FIG. 1. The mobile transmitter 102 may be a cellular telephone, satellite communicator or any other mobile device which transmits signals. First, second and third receiving stations, or sites, 104, 106 and 108 located at known positions receive signals transmitted by the mobile transmitter 102. The receiving sites 104, 106 and 108 may be land-based cellular base stations belonging to a mobile telephone network, may be orbiting satellite relay stations in communication with at least one land-based station, or combinations thereof. A network control processor 110 may control the receiving stations 104, 106 and 108, receives information from the receiving stations 104, 106 and 108, and, based on this information, calculates the position of the mobile transmitter 102. The network control processor 110 may also provide a phase or frequency reference signal $S_R$ to the receiving stations 104, 106 and 108. It is to be understood that the receiving stations 104, 106 and 108 and the network control processor 110 may be widely separated, thus signals are transmitted between the devices over communications links, such as radio links.

Although shown as a separate unit, the network control processor 110 consists of various circuits and processors for performing calculations. As those skilled in the art will readily comprehend, these circuits and processors may alternatively be contained in one of the receiving stations 104, 106 and 108 or may be divided among a plurality of sites. The structure, control and arrangement of the conventional components and circuits have, for the most part, been illustrated in the drawings by readily understandable block representations and schematic diagrams. Only those specific details are shown that are pertinent to the present invention in order not to obscure the disclosure with structural details which will be readily apparent to those skilled in the art having the benefit of the description herein.

The present invention may be advantageously implemented using two or more receiving stations. In particular, the mobile transmitter 102 transmits a first signal $S_1$ at a first frequency $w_1$ which is received by the first and second receiving stations 104 and 106, as respective first and second received signals. The first frequency $w_1$ may be a Random Access Channel (RACH) which is used when the transmitter 102 first initiates contact with the stations 104, 106 and 108 and the processor 110. As is known, the first signal $S_1$ will experience a first phase shift $\phi_{A1}$ during transmission to the first receiving station and a second phase shift $\phi_{B1}$ during transmission to the second receiving station 106. The magnitudes of the phase shifts $\phi_{A1}$ and $\phi_{B1}$ depend upon the distance of travel of the first signal $S_1$ to the respective stations 104 and 106. Consequently, the first and second phase shifts $\phi_{A1}$ and $\phi_{B1}$ will not be equal unless the mobile transmitter 102 is equidistant from the first and second receiving stations 104 and 106.

First and second receiving stations 104 and 106 receive a frequency and phase reference signal from a common source, such as the GPS satellite system of the network control processor 110. The stations 104 and 106 measure the received phases $\phi_{A1}$ and $\phi_{B1}$ of the first signal $S_1$ using the common phase reference signal, and pass the phase measurements to the network control processor.

The network control processor 110 determines a first phase difference measurement $\Delta\phi_1$ in accordance with the following equation:

$$\Delta\phi_1=\phi_{A1}-\phi_{B1} \qquad (1)$$

The mobile transmitter 102 next transmits a second signal $S_2$ at a second frequency $w_2$ which is similarly received by the first and second receiving stations 104 and 106, as respective third and fourth received signals. The second frequency $W_2$ may be a traffic channel, for example, assigned to the transmitter 102 for passing communications traffic after the initial contact on the RACH channel. The mobile transmitter 102 may change between, or transmit at, the first and second frequencies $w_1$ and $w_2$ in a predetermined frequency change schedule (frequency hopping schedule), on command from the network control processor 110 or other control mechanism. The second signal $S_2$ will experience a third phase shift $\phi_{A2}$ during transmission to the first receiving station 104 and a fourth phase shift $\phi_{B2}$ during transmission to the second receiving station 106. The magnitudes of the phase shifts $\phi_{A2}$ and $\phi_{B2}$ will depend upon the distance of travel of the second signal $S_2$ to the respective stations 104 and 106. In an anlogous manner, the first and second stations 104 and 106 determine the phases $\phi_{A2}$ and $\phi_{B2}$ using the common reference signal and pass the measurements to the network control processor 110. The network control processor 110 then computes a second phase difference $\Delta\phi_2$ using:

$$\Delta\phi_2=\phi_{A2}-\phi_{B2} \qquad (2)$$

A time difference dT is next determined using the following equation:

$$dT = \frac{\Delta\phi_1 - \Delta\phi_2}{w_1 - w_2} \qquad (3)$$

The time difference dT is a measure of the difference in propagation delay of the first and second signals $S_1$ and $S_2$ to the respective first and second receiving stations 104 and 106. Since this difference in the propagation delay is dependent upon the difference in the distances between each of the stations 104 and 106 and the mobile transmitter 102, the time difference dT is also a measure of the range difference between each station 104 and 106 and the mobile transmitter 102. A range difference dR is calculated, preferably by the network control processor 110, using the following equation:

$$dR=c*dT \qquad (4)$$

wherein c is the speed of light ($3\times10^8$ m/s). The value (range difference measurement) calculated for the range difference dR places the location of the transmitter 102 on a first hyperbolic curve contained in a family of hyperbolic curves having the first and second receiving stations 104 and 106 as foci.

Using the third receiving station 108, which is preferably not collinear with the first and second stations 104 and 106, the network control processor 110 can receive other measurements that locates the transmitter 102 on a second hyperbolic curve. The intersection of the first and second hyperbolic curves defining the position of the transmitter 102. Alternatively, loop delay measurements, if available, can be used to determine the distances of the transmitter 102 from the first station 104, the second station 106 or both, thereby identifying a segment of the first hyperbolic curve on which the transmitter 102 is located.

The invention is envisaged to be most useful when loop delay measurements are not available or not as accurate as the delta-range measurements made in the above described manner. In those circumstances, loop delay measurements may be used only to resolve ambiguities, although a position uncertainty will still be present in the dimension lying along the first hyperbolic curve. The position accuracy is much better, however, in the dimension perpendicular to the first hyperbolic curve, as this is determined by the more accurate delta-range measurement.

Various sources of error may cause inaccuracies in the calculation of the delta-range measurement dR. Since the transmitter 102 does not transmit at the first and second frequencies $w_1$ and $w_2$ concomitantly, one source of error may arise if the transmitter 102 or any of the receiving stations 104, 106 or 108 are moving. In such a scenario, it is possible for the transmitter 102 to transmit at the first frequency $w_1$ in one location and then to have moved to another location before transmitting at the second frequency $w_2$. The signal at the second frequency $w_2$ would therefore have phase shifting characteristics based, in part, on the distance traveled from the second location. One solution to this problem, and most likely the optimum solution, is to use a Kalman filter algorithm to track changes in all parameters, as discussed more fully below.

Figure 2:
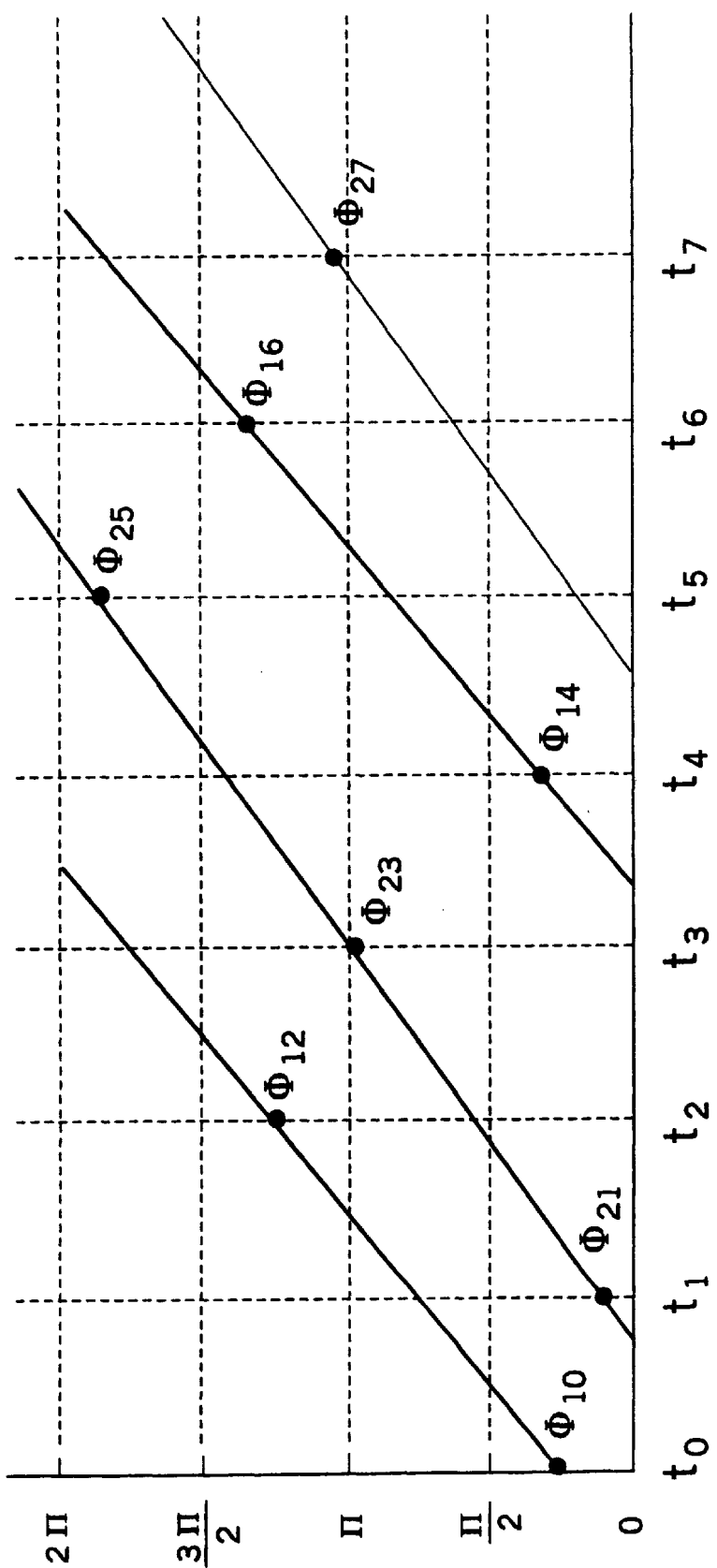
FIG. 2 is graphical representation of successive phase difference measurements taken while the transmitter shown in FIG. 1 is frequency hopping.

Frequency errors in the common reference signal and any errors due to movement of the transmitter 102 or receiving stations 104, 106 and 108 may cause successive changes in the phase difference measurements $\Delta\phi_1$ and $\Delta\phi_2$. A hypothetical progression of phase difference measurements taken at times $t_0, t_1, t_2, t_3 \ldots$ is shown in FIG. 2. For ease of description the phase difference measurements have been labeled $\phi^{1x}$ and $\phi_{2x}$ where the subscripts "1" and "2" represent the first frequency $w_1$ and the second frequency $w_2$, respectively, and the subscript "x" represents a variable integer indicating a time the measurement was taken. For example, a phase difference measurement $\phi_{16}$ is a measurement of a signal having the first frequency $w_1$ taken at the time $t_6$.

For the example illustrated in FIG. 2, the transmitter 102 alternates, or "hops", between transmitting the first signal $S_1$ at the first frequency $w_1$ during even times $t_0, t_2, t_4 \ldots$ and transmitting the second signal $S_2$ at the second frequency $w_2$ during odd times $t_1, t_3, t_5 \ldots$ The graph in FIG. 2 has further been drawn in a modulo-$2\pi$ format in that the phase difference measurements begin again at zero for every $2\pi$ or 360°. As can be seen, phase difference measurements $\phi_{1even-X}$ for the first frequency $w_1$ and phase difference measurements $\phi_{2odd-X}$ for the second frequency $w_2$ move progressively up sloped lines. The slope of the lines is not due to making the measurements at different frequencies, as all measurements on a line are made at either the first or second frequency $w_1$ or $w_2$. Consequently, the slope must be due to the sources of frequency error mentioned above.

The sloped lines representing the phase difference measurements $\phi_{2odd-X}$ for the second frequency $w_2$ may have a slightly different slope than the sloped lines representing the phase difference measurements $\phi_{1even-X}$ for the first frequency $w_1$. The slight difference in slope is due to the fact that the rate of change of phase caused by a fixed frequency error is constant, but the rate of change of phase due to a constant percentage of frequency error is proportional to the frequency. The difference in slope between the two lines will most likely be practically negligible, so that an average slope can be determined using the slope of both lines. Thus, the average slope can be determined by averaging as set forth below:

$$A = \frac{\phi_{12} - \phi_{10}}{t_2 - t_0}$$

$$B = \frac{\phi_{14} - \phi_{12}}{t_4 - t_2}$$

$$C = \frac{\phi_{16} - \phi_{14}}{t_6 - t_4}$$

$$D = \frac{\phi_{23} - \phi_{21}}{t_3 - t_1}$$

$$E = \frac{\phi_{25} - \phi_{23}}{t_5 - t_3}$$

and;

$$F = \frac{\phi_{27} - \phi_{25}}{t_7 - t_5} \ldots \text{etc.}$$

wherein the phase differences are computed modulo-$2\pi$ (i.e. $2\pi$ is added if the difference becomes negative). An average, or determined, slope dW can now be determined by the following equation:

$$dW = \frac{A + B + C + D + E + F + \ldots}{(\text{Number of slopes calculated})}$$

Using the determined slope dW which has the dimensions of a frequency error, values of phase differences at the first frequency $w_1$ and the second frequency $w_2$ may be computed at substantially the same instant in time by interpolation.

Thus a phase measurement $\phi_{21}$ at the second frequency $w_2$ referred to instant of time $t_1$ may be determined by:

$$\phi_{21} = \phi_{10} - dW^*(t_1 - t_o);$$

or, $$\phi_{21} = \phi_{12} - dW^*(t_2 - t_1);$$

or the average of the two values, $$\phi_{21} = \frac{\phi_{10} + \phi_{12} + dW * (2t_1 - t_2 - t_0)}{2}$$

The latter simplifies to:

$$\frac{\phi_{10} + \phi_{12}}{2}$$

if the instants of time $t_o, t_1, t_2 \ldots$ are exactly equispaced in time, and the effects of noise are ignored.

Any prior art method of interpolation, such as least squares curve fitting, may alternatively be used to obtain a best estimated for the phase measurement $\phi_{21}$. Thus, the value of the phase measurement at the second frequency $w_2$ may now be subtracted from the phase measurement made at the first frequency $w_1$ at the same instant of time $t_1$ to obtain a difference value which is corrected for the slope error. This may repeated at other instants of time $t_2, t_3 \ldots$ by interpolating either the line for phase measurements at the first frequency $w_1$ or the line for phase measurements at the second frequency $w_2$, as appropriate, to obtain a succession of phase differences that depend only on the frequency change. If the transmitter 102 and the receiving stations 104, 106 and 108 are known to be stationary, these phase measurements must all correspond to the same range difference dR and the computed range differences at times $t_1$, $t_2$, $t_3$ . . . may be averaged to obtain higher accuracy.

Alternatively, the successive range differences dR computed at times $t_1$, $t_2$, $t_3$ . . . may show a systematic drift, revealing a possible movement of the transmitter 102 or the receiving stations 104, 106 or 108 that was not previously modeled. The principle of a Kalman filter is to model all such movement in order to predict what the range difference should be at a given instant of time. For example, motion of the transmitter 102 may be modeled by assuming a constant velocity which has to be estimated. Alternatively, motion of two receiving stations in earth orbit may be modeled by use of sets of orbital parameters, such as altitude, inclination, eccentricity and the like. When the models predict a range difference that differs from the value computed from measurements at a given instant, the Kalman procedure updates the model parameters such that, on average, the error between the prediction and the measurement is minimized in a least squares sense. When the system of the present invention is used to determine the positions of large numbers of mobile transmitters, the parameters modeling the motion of the receiving stations are common, thus resulting in a very accurate determination of the motion of a receiving station (e.g. satellite orbits) based on receiving signals from many mobile transmitters. This in turn aids accurate position determination for each individual transmitter.

Figure 3:
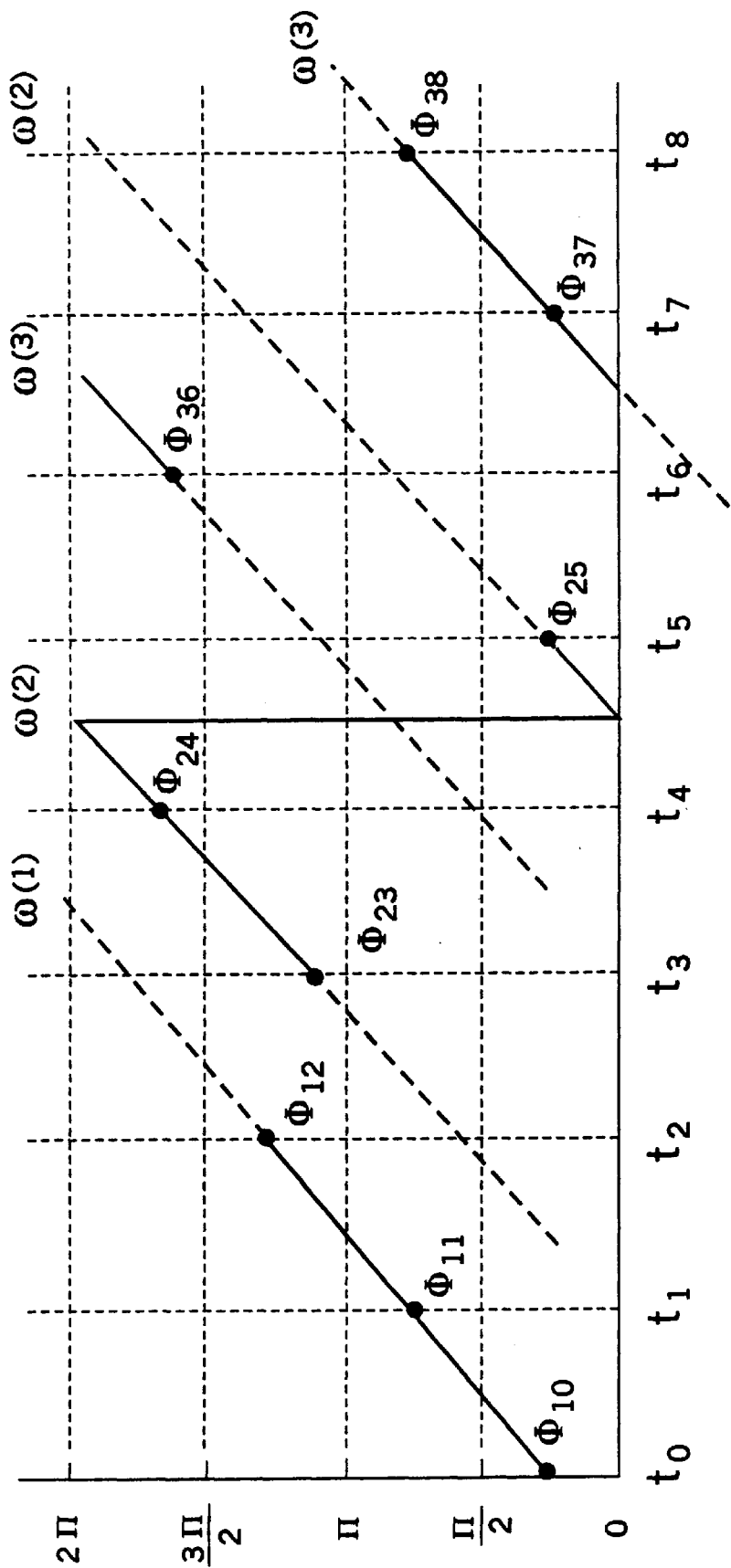
FIG. 3 is a graphical representation of phase difference measurements made on sequentially different frequencies.

FIG. 3 illustrates an alternative measurement sequence when frequency hopping between two or more frequencies is not employed, but other programmed frequency changes are made. In FIG. 3, the transmitter starts out transmitting at the first frequency $w_1$ and a signal phase difference at two receiving stations, such as the first and second receiving stations 104 and 106, is determined at times $t_o$, $t_1$, and $t_2$ to be phase differencemeasurements $\phi_{10}$, $\phi_{11}$, and $\phi_{12}$ respectively. The first frequency $w_1$ can, for example, be the RACH channel frequency as explained above. The transmitter then changes to the second frequency $w_2$ which can be a first traffic channel frequency having a small frequency difference from the RACH channel frequency, for example 50 KHz. Phase difference measurements are then made at the second frequency $w_2$ at times $t_3$, $t_4$ and $t_5$ to obtain phase difference measurements $\phi_{23}$, $\phi_{24}$ and $\phi_{25}$. The transmitter may optionally then switch two another traffic channel frequency, or third frequency $w_3$, at times $t_6$, $t_7$ and $t_8$ at which phase difference measurements $\phi_{36}$, $\phi_{37}$ and $\phi_{38}$ are made.

It will be obvious from FIG. 3 that phase difference measurements at the first frequency $w_1$ and the second frequency $w_2$ at the same instant in time, such as $t_2$ or $t_3$, may be obtained by backward extrapolation of the slope line for the second frequency $w_2$ measurements or by forward extrapolation of the slope line for the first frequency $w_1$ measurements, or both. Thus, a first estimate for a first range difference $dR_1$ is obtained. Likewise, the slope line at the third frequency $w_3$ may be backwards extrapolated and the slope line at the second frequency $w_2$ may be forward extrapolated to obtain a second range difference which must be of the same order as the first range difference $dR_1$. If $w_3-w_2$ is much larger than $w_2-w_1$, there will be $2\pi$ ambiguities. This $2\pi$ ambiguity may be resolved by adding or subtracting multiples of the wavelength at the larger of the higher difference frequency, that is adding or subtracting by multiples of $2\pi*c/(w_3-w_2)$ until the range difference lies close to the first estimate for the first range difference $dR_1$. The second estimate for the second range difference $dR_2$ will however, be more accurate than the first estimate for the first range difference $dR_1$. Implementing other methods of processing the data collected according to FIG. 3, such as best fitting straight lines in a least squares sense, or Kalman filtering, is well within the capabilities of a person skilled in the art.

The above description assumes that the transmitter 102 transmits signals that are received at two separated receiving stations, the receivers then being able in some way to convey the received signals to a common point for phase comparison. Making a phase comparison implies that a signal from one station is available at the same time as a signal from another station.

However, a preferred waveform to be transmitted by the transmitter for communications purposes is a short signal burst occupying a timeslot of a repetitive TDMA frame period. In satellite systems, it is very possible that the differential delay between to paths exceeds the duration of a timeslot, so that the signal is not received at the first receiving station 104 and the second receiving station 106 in overlapping time periods. In this case, a different method of determining phase difference which does not rely on the signals from the stations 104 and 106 being present at both inputs of a phase comparator simultaneously is required.

Figure 4:
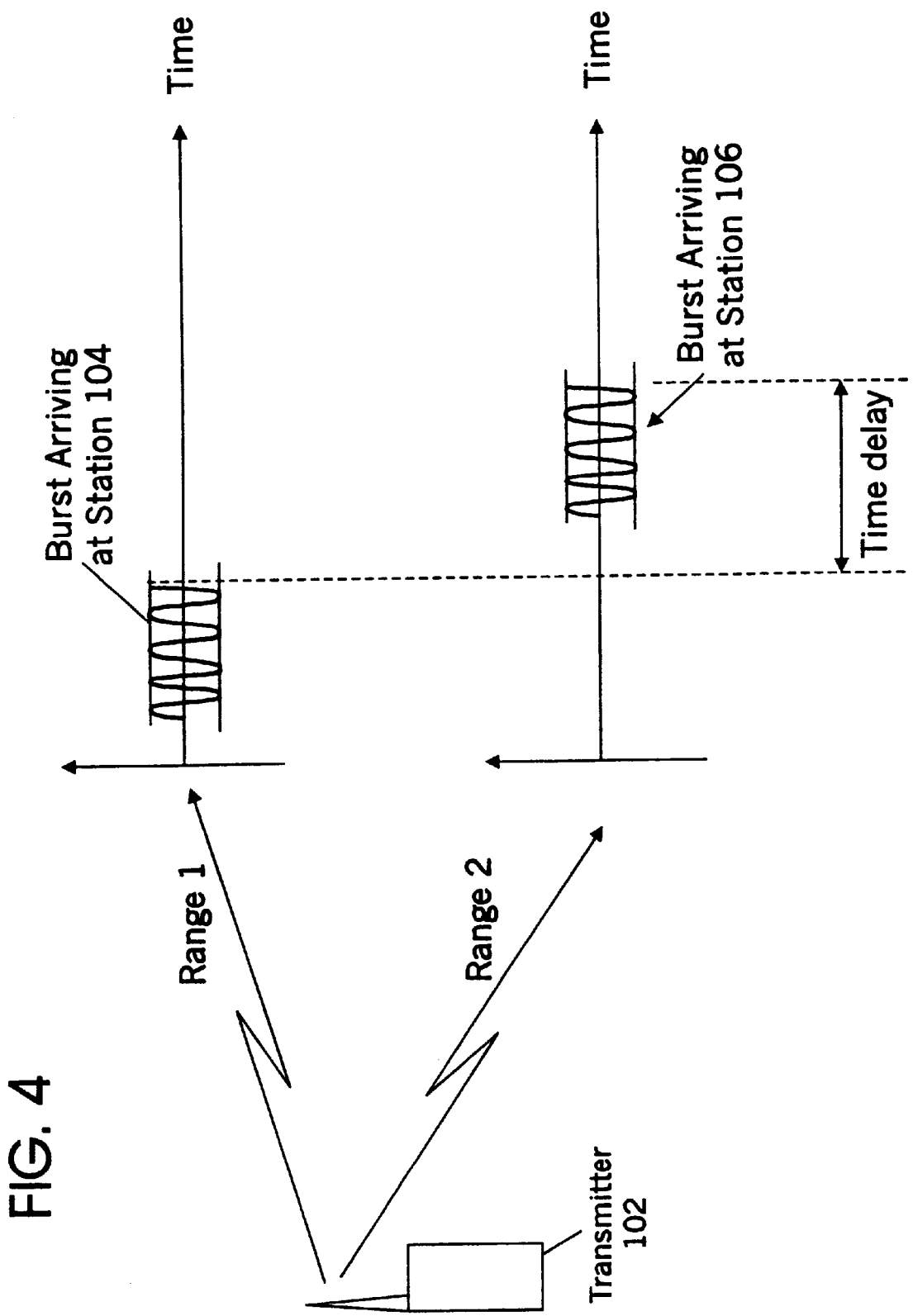
FIG. 4 is a diagram showing non-simultaneous arrival of a signal at two of the receiving stations shown in FIG. 1.

This situation is depicted in FIG. 4. It may be seen that there is no overlap between the period during which a signal burst transmitted from the transmitter 102 is received at the first station 104 and the period during which the same signal burst is received at the second station 106. This occurs when the range difference dR, which is equal to RANGE (1)–RANGE (2) in FIG. 4, exceeds the velocity of light c times the burst duration. There is of course no problem in measuring the phase difference of arrival when the signal is a continuous wave signal (CW) which would be present at both receiving stations 104 and 106 simultaneously. The invention thus comprises the optional implementation of commanding the transmitter 102 to transmit a CW signal for a sufficient duration to guarantee that the CW signal arrives at least two receiving stations in overlapping time periods. The two received signals may then be applied to the two inputs of a phase comparator which determines the phase difference of arrival during the overlapping time period when both signals are present.

If there is no overlapping time period when both signals are present, it is obviously fruitless to apply the signals to the inputs of a phase comparator. Consequently, a novel solution is clearly required for measuring the phase difference of arrival between two signals that do not arrive at the two stations in an overlapping time period.

Figure 5:
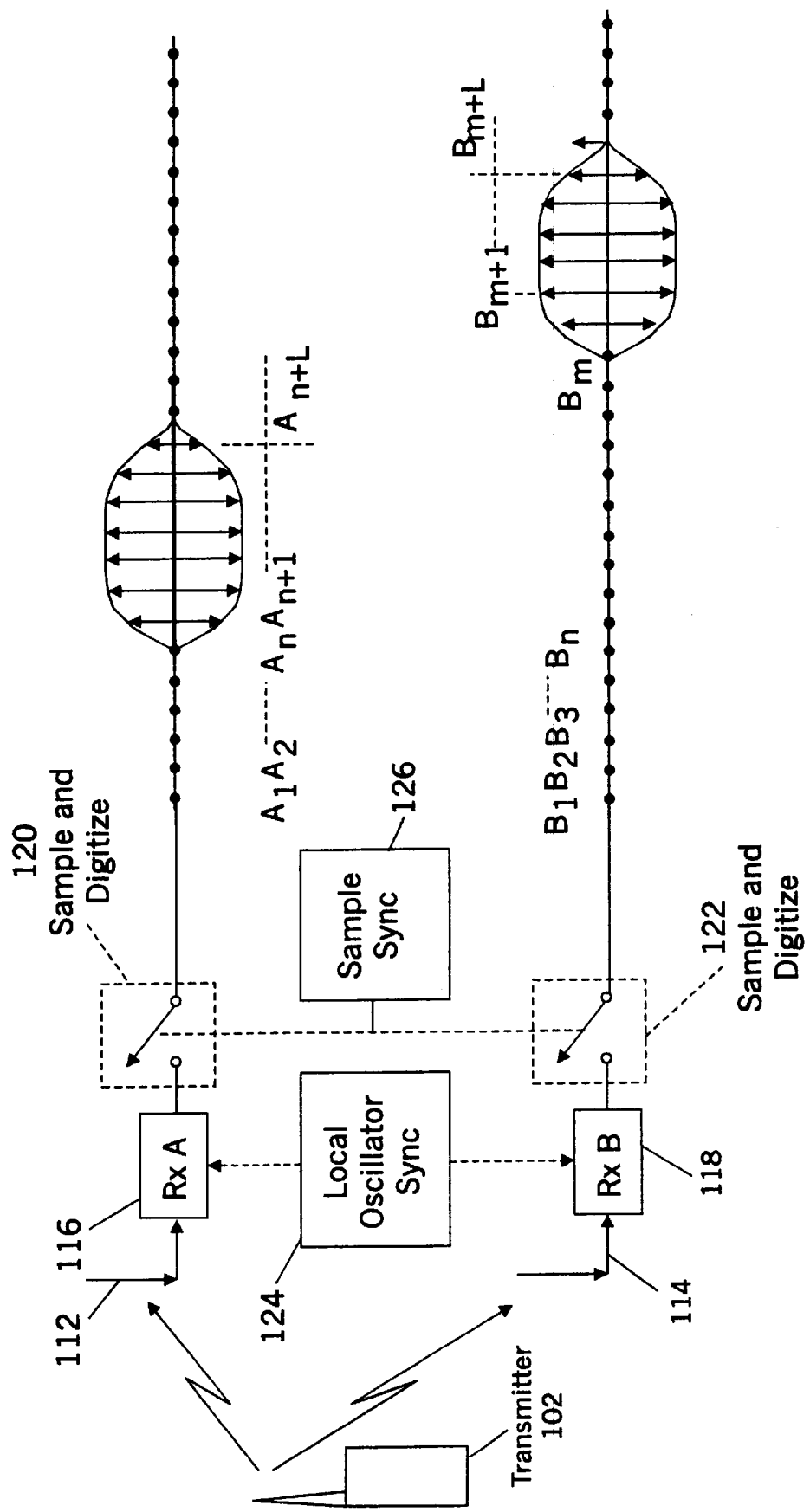
FIG. 5 is a diagram showing phase difference measurements between signals not arriving at the same time at the two receiving stations.

FIG. 5 illustrates the principle of such a solution. The transmitter 102 transmits a signal burst which is received at first and second antennas 112 and 114 of the respective first and second receiving stations 104 and 106. The respective received signals are downconverted in first and second receivers RX-A 116 and RX-B 118 to a suitable frequency for analog-to digital (A to D) conversion and sampling. For example, a suitable frequency spectrum for A to D conversion and sampling is the complex baseband. In the complex baseband, a signal is mixed with Cosine and Sine oscillator signals to produce In-Phase and Quadrature (I, Q) signals that each extend in the spectral domain from zero (DC) to half the receiver bandwidth. The I and Q signals are then sampled and digitized by sampling first and second A to D convertors 120 and 122 in which it is understood that each comprises two conversion channels, one for the I signal component and one for the Q signal component. The resulting first and second signal sample streams $A_1, A_2, A_3 \ldots$ and $B_1, B_2, B_3 \ldots$ are complex samples having both a real (I) part and an imaginary (Q) part. An alternative technique for digitizing a signal while preserving its complex vector representation is the LOGPOLAR technique described in U.S. Pat. No. 5,048,059 issued to Dent, which is hereby incorporated herein by reference.

In order to preserve the relative phase-of-arrival information, it is necessary to employ oscillator synchronizing means 124 to synchronize all local oscillators used in the first and second receivers RX-A 116 and RX-B 118 so that the effects on signal phase of the downconversion processes are at least known. Likewise, it is necessary to employ convertor synchronizing means 126 to synchronize the sampling of the first and second A to D convertors 120 and 122 such that their sampling instants are the same or at least have a known relationship. The oscillator and converter synchronizing means 124 and 126 can, for example, comprise atomic clocks located at the first and second receiving stations 104 and 106 having stabilities of one part in 10 to the power 13, or can comprise GPS satellite navigation receivers which provide accurate time and frequency references. The GPS receivers may also be used to correct slow drifts of the atomic clocks. The GPS receivers are in any case desirable in order to accurately determine the locations of the first and second receiving antennas 112 and 114, as accurate knowledge of the position of signal reception is needed to compute the location of the transmitter 102. Assuming, therefore, that the oscillator and convertor synchronizing means 124 and 126 maintain all local oscillators and sampling clocks in phase and in time, all the information on relative time and phase of arrival of the transmitter signal at the antennas 112 and 114 is contained within the complex first and second signal sample streams $A_1, A_2,$ and $A_3 \ldots$ and $B_1, B_2, B_3 \ldots$ The signal burst from the transmitter 102 affects sample numbers $A_n \ldots A_{(n+L)}$ generated from the first receiver RX-A 116 but, due to delay difference, affects different sample numbers $B_m \ldots B_{(m+L)}$ generated from the second receiver RX-B 118. A conventional crosscorrelation between the first signal sample stream $A_x$ and the second signal sample stream $B_x$ is defined by:

$$C(k) = 1/L \cdot \sum_{i=1}^{i=L} [A(j+i) \cdot B*(j+k+i)]$$

where * means complex conjugate and C(k) is the correlation value. The above computation is repeated for many consecutive values of 'k' to obtain a set of correlation values C(1), C(2) . . . etc. The values of 'k' should range around the nominal time difference of arrival of m-n samples from a smallest possible delay value to a largest possible delay value.

The correlation value C(k) represents the similarity of the first sample stream A starting at sample A(j+1) to the second sample stream B delayed by 'k' samples, i.e. starting at sample B(j+k+1). The similarity is determined over an interval of L consecutive signal samples. The correlation value C(k) is a complex number that has a correlation magnitude and a correlation phase. The correlation magnitude, plotted as a function of 'k', exhibits a characteristic curve, termed the autocorrelation function, which is determined by the modulation pattern imposed on the signal. If the signal is a random digital modulation pattern of sufficient length, or is deliberately chosen to be one of certain sequences that produce desirable autocorrelation functions, then the autocorrelation function is as depicted in FIG. 6. FIG. 6a shows the classical form of the autocorrelation function for a digital signal that is not restricted in bandwidth. The magnitude peaks at unity when the signals at the inputs of the correlator are perfectly aligned, and falls to zero at plus and minus one digital symbol period away from the peak. A digital symbol period is equal to a bit period if the modulation is binary phase shift keying (BPSK) or equal to two bit periods if the modulation is Quadrature Phase Shift Keying (QPSK). In practice, modulation signal bandwidths and receiver bandwidths are restricted to prevent adjacent channel interference. More generally, the Wiener-Khintchine theorem states that the autocorrelation function is the inverse Fourier transform of the signal spectrum, which is affected by transmitter and receiver filtering. As depicted in FIG. 6b, a typical, practical autocorrelation function is more rounded than the function shown in FIG. 6a and oscillates with decreasing amplitude away from the peak.

When the magnitude of the autocorrelation function is plotted, the negative swings of the function will be reflected into the positive half plane (shown by the dashed lines in FIG. 6b.). The width of the main lobe between the first nulls is approximately equal to the reciprocal of the signal's main spectral lobe. For example, if the signal spectral lobe is of the order of 40 KHz wide, then the autocorrelation peak will be of the order of 25 microseconds wide. Thus a first coarse delay estimate of the time difference of arrival may be obtained by correlating the first complex signal stream A with the second complex signal stream B and determining for which value of the sample delay 'k' the correlation magnitude is maximum. The accuracy of this determination will be some fraction of 25 microseconds, for example, one tenth of 25 microseconds or ±2.5 uS.

The coarse delay estimate was obtained from the magnitude of the correlation value C(k) ignoring the phase. The phase of the correlation value C(k) allows a much more accurate determination of the delay however. A more mathematical formulation will illustrate the value of phase.

Let the transmitted signal, designated by S(t), be given by the equation:

$$S(t)=Z(t)EXP(jwt)$$

where Z(t) is a complex function describing both phase and amplitude modulation (if not a pure phase modulation or a pure amplitude modulation) of the signal's carrier frequency, and EXP(jwt) represents the unmodulated carrier frequency. The transmitted signal S(t) is received with a first delay T1 at the first receiving station 104 and with a second delay T2 at the second receiving station 106. Signals A(t) received at the first receiving station 104 and signals B(t) received at the second receiving station 106 are thus given by:

$$A(t)=Z(t-T1)EXP(jw(t-T1))$$

and, $$B(t)=Z(t-T2)EXP(jw(t-T2))$$

The signals A(t) and B(t) are sampled at instants of time $t_1, t_2, t_3 \ldots t_i=i \cdot dT$, where dT is the interval between samples assuming synchronization at both stations 104 and 106. Thus giving rise to the first and second signal sample streams A(i) and B(i) given by:

$$A(i)=A(i \cdot dT)=Z(i \cdot dT-T1)EXP(jw(i \cdot dT-T1))$$

$$B(i) = B(i \cdot dT) = Z(i \cdot dT - T1) EXP(jw(i \cdot dT - T2))$$

Then the correlation value C(k) can be expressed as shown:

$$C(k) = 1/L \sum_{i=1}^{i=L} \left[ Z[(j+i) \cdot dT - T1^*] \cdot \right.$$

$$\left. Z[(j+k+i)dT - T2] \cdot EXP[jw(k \cdot dT - (T1 - T2)]] \right.$$

Since the complex exponential term is independent of the index of summation 'i', it may be moved outside the summation, obtaining:

$$\text{Then } C(k) = 1/L \, EXP\left[ jw(k \cdot dT - (T1 - T2)] \cdot \sum_{i=1}^{i=L} [Z[(j+i) \cdot$$

$$dT - T1] \cdot Z[(j+k+i)dT - T2]\right]$$

$$= Cm(k) \cdot EXP[jw(k \cdot dT - (T1 - T2)]$$

$$= Cm(k) \cdot EXP[jw(k \cdot dT - (T1-T2)]$$

where Cm(k) is an autocorrelation function of the signal modulation Z(t) detached from the carrier frequency 'w', and whose autocorrelation function was exemplified in FIG. 6b.

Since the complex exponential term is always of unit magnitude, it does not affect the magnitude of the correlation value C(k), which is equal to the autocorrelation function Cm(k), but does affect its phase angle by the amount given by:

$$\phi(k) = w(k \cdot dT - (T1-T2))$$

In finding the correlation value C(k) with maximum magnitude, we have found the value of 'k' for which k·dT is closest to the true delay difference T1–T2, thus minimizing φ(k). Of course, φ(k) is, in any case, reduced modulo-2π, so it is not possible to tell exactly how many whole cycles of the carrier frequency w are missing. This corresponds to an ambiguity in the range difference measurement dR of an unknown number of wavelengths of the carrier frequency w. With an error in the coarse estimate of ±2.5 uS and a carrier frequency of 2 GHz, the ambiguity is ±500 wavelengths. It is not possible, therefore, to tell which one of 1,000 possible values is the true delay value. This ambiguity is resolved according to the invention by repeating the correlation when the transmitter is using a different frequency. For description purposes, assume that the about example was performed with a carrier frequency w equal to the first frequency $w_1$ and the different frequency is the second frequency $w_2$. Thus, we obtain $$\phi(1, k) = w_1 \cdot (k \cdot dT - (T1-T2))$$

$$\phi(2, k) = w_2 \cdot (k \cdot dT - (T1-T2))$$

with care being taken at the receiving stations to compare correlations having the same value of 'k'.

On the assumption that the range difference dR=T1–T2 does not change between the instants of time that the transmitter transmits on the first frequency $w_1$ and the instants of time it transmits on the second frequency $w_2$, the above phase values are subtracted to give a phase difference dφ:

$$d\phi = \phi(1,k) - \phi(2,k) = (w_1 - w_2) \cdot (k \cdot dT - (T1-T2))$$

It will be recalled that the value of k·dT–(T1–T2) has been reduced by choosing a value for k on the order of ±2.5 uS. By now choosing values for the first and second frequencies $w_1$ and $w_2$ such that their difference $w_1-w_2$ is less than π/5 uS (i.e. the frequency difference is 100 KHz), for example, the value of the phase difference dφ determined above will lie between ±π/2 and thus not be ambiguous. We may then determine a more redefined value for the range difference T1–T2 as follows:

$$T1 - T2 = k \cdot dT - \frac{d\phi}{w_1 - w_2}$$

Suppose for example that $w_1-w_2$ is 2π×50 KHz, and that we can measure the phase difference dφ with an accuracy of ±5 degrees. Then residual error $\epsilon_r$ on the range difference T1–T2 will be:

$$\epsilon_r = \pm 5/360.50000 = \pm 0.27 \, \mu S$$

The accuracy has thus been improved by almost an order of magnitude from 2.5 $\mu S$ to 0.27 $\mu S$ accuracy.

The measurements can now be repeated with a greater value of the frequency difference $w_1-w_2$. As we start now with a smaller uncertainty of 0.27 $\mu S$ which allows frequency differences of the order of 1 MHz to be used without creating modulo-2π ambiguities. Using 1 MHz frequency difference, the accuracy may be improved by a further factor of 20 to ±0.0135 $\mu S$ which represents a range difference error of ±4 meters.

If the value of the range difference T1–T2 is not constant between the period of transmission at the first frequency $w_1$ and the period of transmission at the second frequency $w_2$, the rate of change can be determined by the method illustrated graphically in FIGS. 2 and 3, namely by determining the difference between successive measurements on the same frequency and then interpolating or extrapolating to determine the difference between measurements on different frequencies translated to the same instant of time.

It has thus been shown above how a combination of time-of-arrival difference measurements and complex correlation phase difference computations can be used to determine accurate range differences, and hence determine the position of a transmitter by solving known hyperbolic navigation equations.

Figure 7:
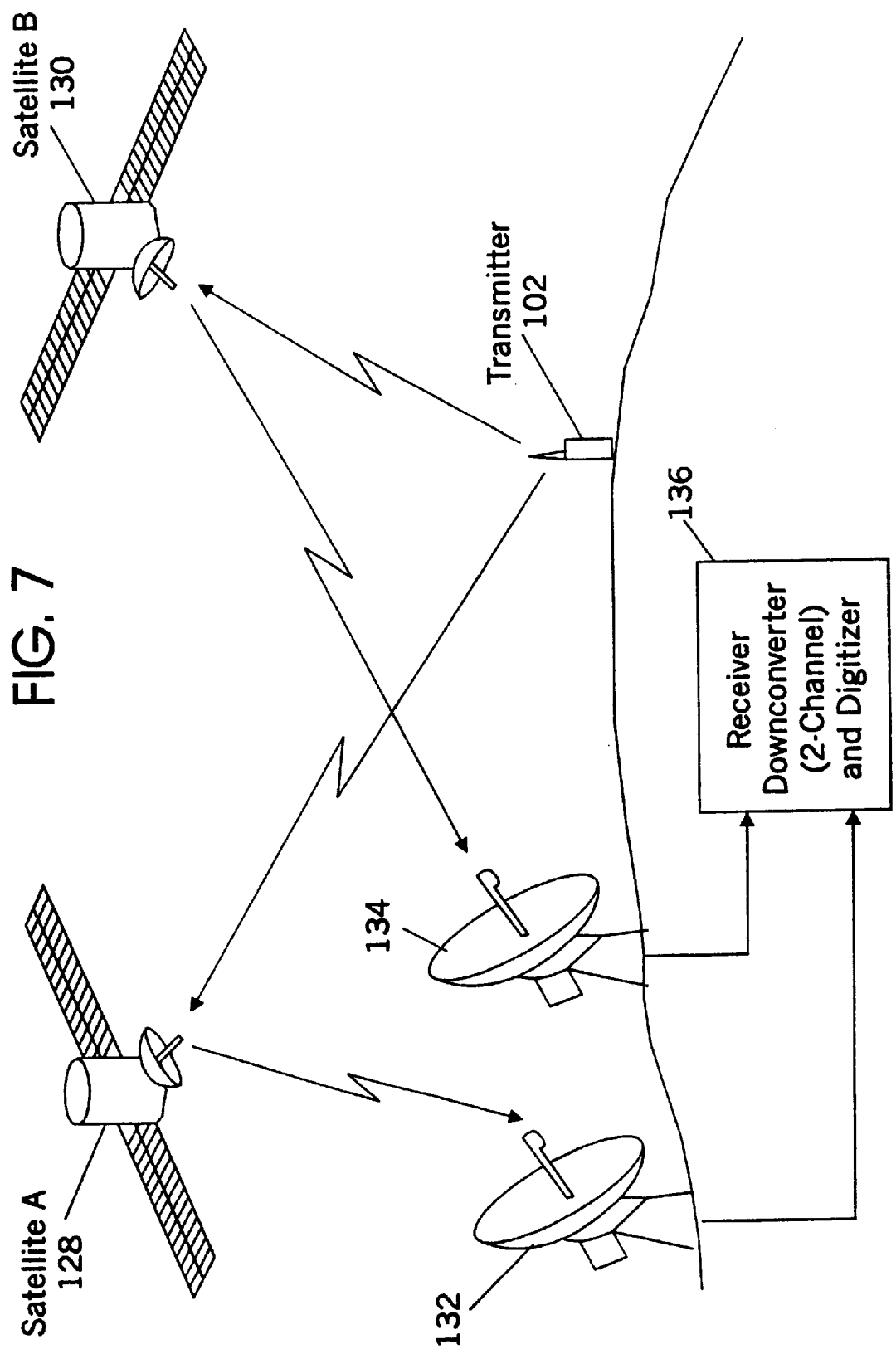
FIG. 7 is a schematic of a system in accordance with the present invention wherein at least one of the receiving stations is a satellite.

FIG. 7 shows the use of first and second orbiting satellites 128, 130 as the at least two separated receiving stations needed by the invention. A signal from the mobile transmitter 102 is received at the satellites 128 and 130 and, after translation of the signal from the transmitter's original frequency to a feederlink frequency, the satellites 128 and 130 relay the signal to respective first and second ground antennas 132 and 134. Preferably, the antennas 132 and 134 are located at approximately the same site on the ground, thus facilitating connection to a common, dual-channel receiving system 136.

Figure 8:
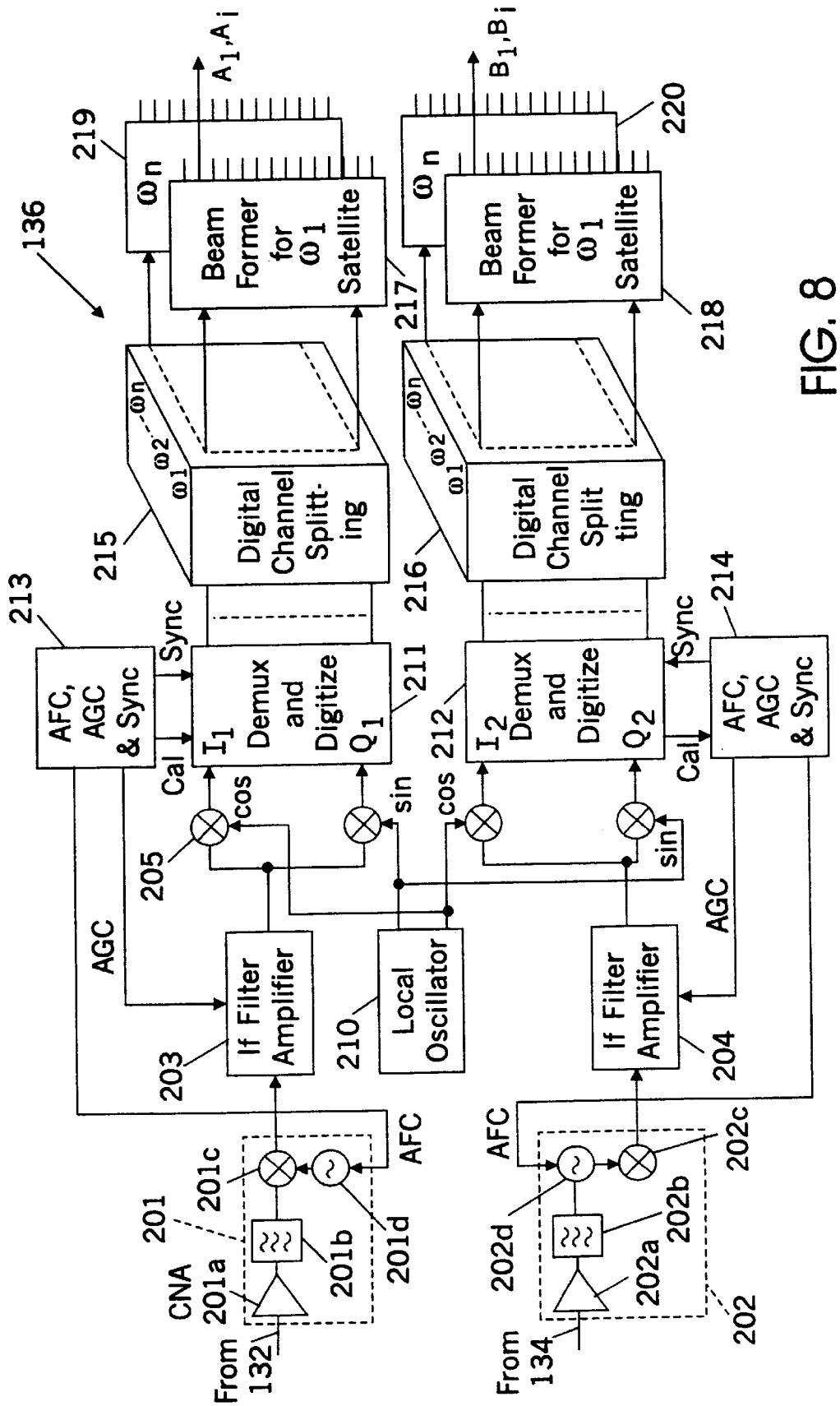
FIG. 8 is a schematic diagram of an exemplary dual channel receiving system in accordance with one aspect of the present invention.

FIG. 8 shows more detail of an exemplary dual-channel receiving system having first and second receiving channels. The signal from the first antenna 132 is fed to a first downconvertor 201 and the signal from the second antenna 134 is fed to a second downconvertor 202. The first downconvertor 201 comprises a low noise amplifier 201*a*, a filter 201*b*, a mixer 201*c* and a local oscillator 201*d*. The second downconvertor 202 is identically constructed with a low noise amplifier 202*a*, a filter 202*b*, a mixer 202*c* and a local oscillator 202*d*. The downconvertors 201 and 202 preferably reside at the focus of their respective antennas since it is easier to transmit an intermediate frequency output to further processing circuits using flexible coaxial cable than to transmit the original microwave feederlink signal using a waveguide.

The intermediate frequency outputs from the downconvertors 201 and 202 are further amplified and filtered in IF filter amplifiers 203 and 204. The outputs of the IF filter amplifiers 203 and 204 are fed to respective quadrature downconvertors. Quadrature downconvertors 205 and 207 are supplied the signals received from the first satellite 128 and quadrature downconvertors 206 and 208 are supplied the signals received from the second satellite 130. The quadrature downconvertors 205, 206, 207 and 208 mix their input signals with a cosine and a sine wave signal from a third local oscillator 210 which is common to both receiver channels. The quadrature downconvertors 205 and 206 output I-waveforms to respective demultiplexer/digitizers 211 and 212. The quadrature downconvertors 207 and 208 output Q-waveforms to the respective demultiplexer/digitizers 211 and 212. The operation of a time-multiplexed feederlink is described in more detail in U.S. Pat. Nos. 5,596,961, 5,555,271, 5,619,503, 5,619,210, 5,574,967, 5,568,088 and 5,642,358, the disclosures of which are hereby incorporated by reference herein.

The feederlink signal comprises a time multiplex of signals from the satellite's receiving antenna elements, together with some known test or calibration signals. The calibration signal may for example be set on board the satellite to 1+jO so that, when its sample occurs in the time-multiplexed feederlink stream, it is known that the I-waveform value should be unity and the Q-waveform value should be zero. Demultiplexer units 211 and 212 thus extract calibration signal samples from the I and Q waveforms received from the quadrature downconvertors 205, 206, 207 and 208. These calibration signal samples are provided to automatic frequency control (AFC), automatic gain control (AGC) and synchronization (SYNC) units 213 and 214 where the calibration samples are compared with expected values and error signals produced. The error signals are used for three purposes: (1) to apply AGC to the IF filter amplifiers 203 and 204 such that the magnitude of the calibration samples is controlled to the expected value; (2) to apply AFC or automatic phase control (APC) to the first and second local oscillators 201 d and 202d such that the phase of the calibration samples is controlled to the expected value; and (3) to correct any sampling timing error in the demultiplexers 211 and 212 such that the calibration samples are sampled in the middle of their optimum sampling range. In this way, all phase and amplitude matching errors in the two feederlink channels from the satellite through respective ground processing channels is removed up to the outputs of the demultiplexers 211 and 212.

The outputs of the demultiplexers 211 and 212 each represent the composite of all signals received by one of the satellite receiving antenna 132 or 134, which may comprise many mobile transmitter signals operating on different channel frequencies. Digital channel splitting units 215 and 216 first split the signal from each antenna element into a number of signals from each element corresponding to different channel frequencies $w_1, w_2 \ldots w_n$. The set of antenna element signals for a particular frequency, for example $w_1$, is then fed to a digital beamformer, shown as reference number 217 for the first satellite 128 and reference numeral 218 for the second satellite 130. The set of antenna element signals for frequency $w_n$ are fed to digital beamformers 219 and 220. Although only four beamformers 217, 218, 219 and 220 are shown, there is a separate pair of digital beamformers for each frequency $w_1, w_2 \ldots w_n$.

The digital beamformers 217, 218, 219 and 220 combine the signals from each satellite antenna element using complex coefficients in order to create multiple, directive receiving beams that discriminate signals from different directions. Although the exemplary system first performs channel splitting followed by direction splitting, it is to be understood that this is merely a preferred arrangement. The operations of channel splitting and direction splitting can be reversed by use of a wideband beam former followed by channel splitting on a per-beam basis. The advantage of the preferred arrangement is that it allows staggering of beam directions on different channel frequencies (or even timeslots on a single frequency) in order to obtain higher spectral efficiency by greater frequency reuse on the ground, as is more fully described in the incorporated references.

When the transmitter 102 is located in one of the receiving beams so formed, its signal emerges enhanced by the appropriate one of the beam outputs of the beamformer assigned to that transmitter frequency. For example, when the transmitter 102 is transmitting on the first frequency, or channel $w_1$, its signal emerges from one beam output of the beamformer 217 and a different beam output from the beamformer 218, as the beam number is not necessarily the same for the first and second satellites 128 and 130 as they illuminate the earth slightly differently because of their separation in space. Thus, the complex number streams $A_1, A_2, A_3 \ldots$ and $B_1, B_2, B_3 \ldots$ depicted in FIG. 5 emerge from the beamformers 217 and 218 respectively when the transmitter 102 is operating on the first frequency $w_1$, or from the beamformers 219 and 220 if the transmitter 102 is operating on the nth frequency $w_n$. It may be assumed that the position of the transmitter 102 is already known by some other means to an accuracy of at least a fraction of a beam's diameter on the ground, so that the beam output from which the transmitter signal emerges is known. This may for example be determined by detecting a Random Access Burst from the transmitter 102 in a RACH detector (not shown) for that beam, and not in the RACH detectors of other beams.

As well as processing sample streams $A_1, A_2, A_3 \ldots$ and $B_1, B_2, B_3 \ldots$ to determine the location of the transmitter 102, the streams $A_1, A_2, A_3 \ldots$ and $B_1, B_2, B_3 \ldots$ may be fed to a diversity demodulation and decoder to extract transmitted information, as described in U.S. patent application ser. No. 08/305,904, entitled "Diversity-Oriented Channel Allocation In A Mobile Communications System", to Dent and Ewerbring and filed on Dec. 12, 1994, the disclosure of which is hereby incorporated by reference.

Once the sample streams $A_1, A_2, A_3 \ldots$ and $B_1, B_2, B_3 \ldots$ are generated, they may be stored, or certain characteristics of them, such as correlations, may be computed and stored for off-line processing. Thus, the determination of a transmitter's location does not need to be done in real time. The position can be deduced later, as required, by processing the stored sample streams retrospectively. Moreover, the invention can comprise using a number of fixed transmitters on the ground having accurately known positions to assist in determining necessary parameters such as satellite position at a given time. Signals from such transmitters may be transmitted periodically and, after emerging from appropriate channel/beam outputs of the ground processing, can be stored for processing off line.

The elements of the invention comprise transmitting a signal from the transmitter to be localized and receiving the signal at two separated receiving sites, the signal being downconverted, sampled and digitized at each site using synchronized or otherwise known local oscillator frequency and sampling time references. The respective signal samples are then communicated to a common location, such as a network processor, where they are processed to yield an accurate range difference from the transmitter to the respective receiving sites.

In one implementation, the two separated receiving sites comprise two orbiting satellite relay stations that relay the received signals to a ground station. In relaying the signals, the satellites change the frequency received from the transmitter to a different frequency called the feederlink, on which the relayed signals are transported to the ground station. In that case synchronization means 124 shall comprise means to synchronize the local oscillators on board respective spacecraft so that any phase difference therebetween is preferably zero, or at least predictable. Such means can comprise transmitting a pilot signal from the ground station to both satellites, which may be precompensated for Doppler shift separately for each satellite in order to account for satellite movement. The above listed patents, which were incorporated herein by reference, describe satellite transponder means which, in connection with multi-beam or phased array satellite receiving antennas, allow the received phases of all signals received at each satellite to be preserved over the feederlink transmission, which property is useful in the context of this invention.

The invention described above with the aid of the incorporated references and FIGS. 1 through 6 inclusive permits of a variety of implementations using either land-based stations or airport or orbiting satellite stations, and with a variety of transmitters using either CW signals or signals with arbitrary modulation, including short TDMA signal bursts. All such variations that may be made by a person skilled in the art with the aid of the above teachings lie within the spirit and scope of the invention as described in the following claims.

What is claimed is:

1. A method for determining position of a mobile transmitter comprising the steps of:

transmitting a first signal at a first frequency from the mobile transmitter;

receiving the first signal at first and second receiving sites as respective first and second received signals;

transmitting a second signal at a second frequency subsequent to the first signal transmission from the mobile transmitter;

receiving the second signal at the first and second receiving sites as respective third and fourth received signals;

making a first phase difference measurement based on the first and second received signals;

making a second phase difference measurement based on the third and fourth received signals;

determining position of the mobile transmitter based on the first and second phase difference measurements and the first and second frequencies.

2. The method as recited in claim 1 wherein the step of making a first phase difference measurement comprises the steps of:

determining a first phase for the first received signal relative to a reference signal;

determining a second phase for the second received signal relative to the reference signal;

making the first phase difference measurement based on the first and second phases.

3. The method as recited in claim 2 wherein the step of making a second phase difference measurement comprises the steps of:

determining a third phase for the third received signal relative to a reference signal;

determining a fourth phase for the fourth received signal relative to the reference signal; and making the second phase difference measurement based on the third and fourth phases.

4. The method as recited in claim 1 wherein the step of determining position of the mobile transmitter comprises the step of:

determining a difference between the first and second phase difference measurements.

5. The method as recited in claim 4 wherein the step of determining position of the transmitter comprises the steps of:

determining a frequency difference based on the first and second frequencies; and determining the position of the mobile transmitter based on the first and second phase differences and the frequency difference.

6. The method as recited in claim 4 wherein the step of determining position of the mobile transmitter comprises the steps of:

determining a frequency difference between the first and second frequencies; and scaling the difference between the first and second phase difference measurements by the frequency difference to obtain a range difference.

7. The method as recited in claim 6 wherein the step of determining position of the mobile transmitter comprises the step of:

determining the position of the mobile transmitter on a first hyperbola of a constant range difference.

8. The method as recited in claim 6 further comprising the steps of:

calculating third and fourth phase difference measurements for a third receiving site and one of the first and second receiving sites;

localizing the transmitter on a second hyperbola related to the third receiving site and the one of the first and second receiving sites; and determining the position of the mobile transmitter based on the intersection of the first and second hyperbolas.

9. The method as recited in claim 1 wherein at least one of the first and second receiving sites is a land-based cellular base station.

10. The method as recited in claim 1 wherein at least one of the first and second receiving sites is a satellite relay station.

11. The method as recited in claim 1 wherein the transmitter comprises a cellular telephone.

12. The method as recited in claim 1 wherein the step of transmitting a first signal at a first frequency comprises the step of:

transmitting at the first frequency which is a random access channel.

13. The method as recited in claim 1 wherein the step of transmitting a second signal at a second frequency comprises the step of:

transmitting at the second frequency which is a traffic channel.

14. The method as recited in claim 1 wherein at least one of the first and second frequencies is contained in set of frequencies allocated to the mobile transmitter for frequency hopping communication.

15. The method as recited in claim 1 wherein at least one of the first and second frequencies is comprised of signal bursts formatted in accordance with a time division multiple access format.

16. The method as recited in claim 1 wherein the step of making a first phase difference measurement and the step of making a second phase difference measurement comprise the steps of:

converting the first, second, third and fourth received signals into a digital stream of numerical values representative of instantaneous phases of the first, second, third and fourth received signals; and determining the position of the transmitter based on the stream of numerical values and the first and second frequencies.

17. The method as recited in claim 16 wherein the step of converting comprises the steps of:

downconverting the first and third received signals to a first intermediate frequency;

downconverting the second and fourth received signals to a second intermediate frequency; and sampling and analog-to-digital converting the downconverted first, second, third and fourth received signals.

18. The method as recited in claim 17 wherein the step of downconverting the first and third received signals comprises the step of:

using a first local oscillator to generate the first intermediate frequency, and wherein the step of downconverting the second and fourth received signals comprises the step of:

using a second local oscillator to generate the second intermediate frequency.

19. The method as recited in claim 17 further comprising the step of synchronizing the first and second intermediate frequencies to a common reference frequency.

20. The method as recited in claim 19 further comprising the step of deriving the common reference frequency from satellite navigation signals.

21. The method as recited in claim 17 further comprising the step of:

synchronizing the sampling of the first, second, third and fourth received signals to a common time reference.

22. The method as recited in claim 21 further comprising the step of:

deriving the common time reference from satellite navigation signals.

23. The method as recited in claim 17 wherein the intermediate frequency is approximately zero, and the step of sampling and analog-to-digital converting comprises the step of:

quadrature converting the downconverted first, second, third and fourth received signals to yield the stream of numerical values containing complex values.

24. The method as recited in claim 17 wherein and the step of sampling and analog-to-digital converting comprises the step of:

logpolar converting the downconverted first, second, third and fourth received signals to yield the stream of numerical values containing numerical value pairs representative of instantaneous signal phase and amplitude.

25. The method as recited in claim 16 wherein the step of determining the position comprises the step of:

determining first, second, third and fourth phase difference measurements for the first, second, third and fourth received signals.

26. The method as recited in claim 25 wherein the step of determining the position comprises the step of:

correlating the stream of numerical values to determine an integral number of samples delay between arrival of the first and second received signals and the third and fourth received signals and to determine respective first and second correlation phases.

27. The method as recited in claim 26 wherein the step of correlating comprises the step of:

determining the correlation phases at the first frequency and the second frequency; and using the correlation phases to determine the first and second phase difference measurements.

28. The method as recited in claim 1 wherein the step of making a first phase difference measurement comprises the step of:

performing multiple measurements of the first phase difference measurement at different instants of time; and interpolating or extrapolating the multiple measurements to determine a value for the first phase difference measurement at an instant of time at which the second phase difference measurement was made.

29. The method as recited in claim 1 further comprising the steps of:

determining a frequency difference between the first and second frequencies;

comparing the frequency difference to a predetermined frequency value; and if the determined frequency difference is less than the predetermined frequency value, selecting a new value for at least one of the first and second frequencies such that the frequency difference is larger and repeating the first and second phase difference measurements using the new value for the at least one of the first and second frequencies.

30. A system for determining position of a mobile transmitter, the mobile transmitter being capable of transmitting first and second signals at respective first and second frequencies, the second signal transmitted subsequent to the first signal, the system comprising:

phase comparator means for determining respectively a first and second phase difference between the first signal as received at the first and second stations and second signal as subsequently received at the first and second stations; and a network control processor for determining a range of difference measurement of the mobile transmitter based on the first and second phase difference measurements and the first and second frequencies.

31. The system as recited in claim 30 wherein at least one of the first and second receiving stations comprise a satellite relay station.

32. The system as recited in claim 30 wherein at least one of the first and second receiving stations comprise a land-based cellular station.

33. The system as recited in claim 30 wherein the mobile transmitter comprises a cellular telephone.

* * * * *